(12) United States Patent
Herzberg (10) Patent No.: US 10,363,883 B2
(45) Date of Patent: Jul. 30, 2019

(54) ROAD FINISHING MACHINE WITH RETAINER DEVICE FOR SUPPORTING AND POSITIONING A SENSOR UNIT

(71) Applicant: JOSEPH VOEGELE AG, Ludwigshafen/Rhein (DE)

(72) Inventor: Ingo Herzberg, Angelbachtal (DE)

(73) Assignee: JOSEPH VOEGELE AG, Ludwigshafen/Rhein (DE)

( * ) Notice: Subject to any disclaimer, the term of this patent is extended or adjusted under 35 U.S.C. 154(b) by 0 days.

(21) Appl. No.: 15/938,573

(22) Filed: Mar. 28, 2018

(65) Prior Publication Data
US 2018/0281693 A1    Oct. 4, 2018

(30) Foreign Application Priority Data
Mar. 29, 2017    (EP) ..................... 17163505

(51) Int. Cl.
*E01C 19/48* (2006.01)
*B60R 11/00* (2006.01)
(Continued)

(52) U.S. Cl.
CPC ............. *B60R 11/00* (2013.01); *E01C 19/004* (2013.01); *E01C 19/42* (2013.01); *E01C 19/48* (2013.01);
(Continued)

(58) Field of Classification Search
CPC ............... B60R 11/00; B60R 2011/004; B60R 2011/0049; B60R 2011/0071;
(Continued)

(56) References Cited

U.S. PATENT DOCUMENTS 3,282,377 A    11/1966 Pfeiffer et al.
3,710,695 A *   1/1973 Miller ................. E01C 19/4893
                                                                 180/434
(Continued)

FOREIGN PATENT DOCUMENTS

CN    102828458 A    12/2012
CN    102828459 A    12/2012
(Continued)

OTHER PUBLICATIONS

European Communication dated Jan. 31, 2018, Application No. 17 163 505.5-1002, Applicant Joseph Voegele AG, 5 Pages.
(Continued)

*Primary Examiner* — Raymond W Addie
(74) *Attorney, Agent, or Firm* — Brooks Kushman P.C.

(57) ABSTRACT

A road finishing machine comprises a height-adjustable screed mounted to a chassis of the road finishing machine for laying a paving layer, and at least one retainer device for supporting and positioning at least one sensor unit. The retainer device comprises at least one supporting arm module, at least one sensor module including the sensor unit, and at least one link that may be movably positioned at the supporting arm module to which the sensor module may be mounted and which mounts the sensor module to the supporting arm module. Furthermore, the sensor module comprises a retainer with a mounting plate which is releasably mounted to the link.

20 Claims, 8 Drawing Sheets

(51) Int. Cl.
*E01C 19/00* (2006.01)
*E01C 19/42* (2006.01)
*F16M 13/02* (2006.01)

(52) U.S. Cl.
CPC ...... *F16M 13/022* (2013.01); *B60R 2011/004* (2013.01); *B60R 2011/0049* (2013.01); *B60R 2011/0071* (2013.01); *B60R 2011/0084* (2013.01); *B60R 2011/0085* (2013.01); *E01C 2301/00* (2013.01)

(58) Field of Classification Search
CPC ..... B60R 2011/0084; B60R 2011/0085; E01C 19/004; E01C 19/42; E01C 19/48; E01C 2301/00; F16M 13/022
USPC .................................................. 404/119, 118
See application file for complete search history.

(56) References Cited

U.S. PATENT DOCUMENTS

| | | | |
|---|---|---|---|
| 4,543,006 | A | 9/1985 | Wang |
| 5,058,239 | A | 10/1991 | Lee |
| 5,258,961 | A | 11/1993 | Sehr et al. |
| 5,393,167 | A | 2/1995 | Fujita et al. |
| 5,599,134 | A | 2/1997 | Macku et al. |
| 5,975,473 | A * | 11/1999 | Haas .................... E01C 19/006 172/4 |
| 6,729,596 | B2 | 5/2004 | Fumado Gilabert |
| 8,702,344 | B2 | 4/2014 | Hanfland |
| 9,032,983 | B2 | 5/2015 | Jin |
| 9,033,611 | B2 | 5/2015 | Hanfland et al. |
| 2004/0056170 | A1 | 3/2004 | Fumado Gilabert |
| 2014/0356050 | A1 | 12/2014 | Yu et al. |
| 2017/0292230 | A1 | 10/2017 | Herzberg |
| 2017/0292231 | A1 | 10/2017 | Herzberg |

FOREIGN PATENT DOCUMENTS

| | | |
|---|---|---|
| CN | 203629600 U | 6/2014 |
| CN | 207121792 U | 3/2018 |
| DE | 691 26 017 T2 | 11/1997 |
| DE | 602 26 237 T2 | 5/2009 |
| EP | 1 403 434 A1 | 3/2004 |
| EP | 3 228 747 A1 | 10/2017 |
| EP | 3 228 748 A1 | 10/2017 |
| JP | 56-82010 U | 7/1981 |
| JP | 63-147003 A | 6/1988 |
| JP | 2-261105 A | 10/1990 |
| JP | 3-199501 A | 8/1991 |
| JP | 4-41802 A | 2/1992 |
| JP | 4-108904 A | 4/1992 |
| JP | 4-179710 A | 6/1992 |
| JP | H4-179705 A | 6/1992 |
| JP | 4-77610 U | 7/1992 |
| JP | 6-8410 U | 2/1994 |
| JP | 7-127017 A | 6/1995 |

OTHER PUBLICATIONS

Chinese Search Report dated Mar. 29, 2018, Application No. 2017101473241, 2 Pages.
Chinese Office Action dated Apr. 4, 2018, Application No. 201710147324.1, 3 Pages.
U.S. Non-Final Office Action dated Apr. 17, 2018, U.S. Appl. No. 15/458,276, 32 Pages.
European Search Report dated Jun. 24, 2016 Application No. 16 16 4466.1, Letter identifiers that indicate relevance of the cited documents.
European Search Report dated Sep. 6, 2017 Application No. 17 16 3505.5, Letter identifiers that indicate relevance of the cited documents.
CN 203629600 U, Abstract & Machine Translation.
DE 691 26 017 T2, U.S. Pat. No. 5,393,167.
DE 602 26 237 T2, U.S. Pat. No. 6,729,596 B2.
JP 56-82010 U, Machine Translation—Description & Claims (Abstract Not Available).
JP 63-147003 A, Machine Translation—Description & Claims (Abstract Not Available).
JP 4-41802 A, Abstract & Machine Translation.
JP 4-108904 A, Abstract & Machine Translation.
JP 4-179710 A, Abstract & Machine Translation.
JP 4-77610 U, Machine Translation—Description & Claims (Abstract Not Available).
JP 7-127017 A, U.S. Pat. No. 5,258,961.
European Search Report dated Oct. 12, 2016, Application No. EP 16164470.3-1604, Applicant Joseph Voegele AG, 6 Pages.
Japanese Office Action dated Jun. 1, 2018, Dispatch No. 236817, Application No. 2017-075809, 3 Pages.
U.S. Office Action dated Apr. 17, 2018, U.S. Appl. No. 15/480,866, 15 Pages.
European Search Report dated Jun. 24, 2016, Application No. EP 16 16 4466.1, 5 Pages.
European Search Report dated Sep. 6, 2017, Application No. EP 17 16 3505.5, 6 Pages.
Japanese Office Action dated Jun. 20, 2017, Application No. 2017-032345, 7 Pages.
Japanese Office Action Application No. 2018-062582 dated Mar. 4, 2019, English Machines Translation—Notification of Reasons for Refusal.
JP 2-261105 A, Abstract & Machine Translation.
JP 3-199501 A, Abstract & Machine Translation.
JP 6-8410 A, Machine Translation (Abstract Not Available).
Japanese Office Action dated Mar. 4, 2019, Application No. 2018-062582, 3 Pages.
U.S. Notice of Allowance dated Nov. 6, 2018, U.S. Appl. No. 15/480,866, including Allowed Claims, 14 Pages.
U.S. Notice of Allowance dated Nov. 13, 2018, U.S. Appl. No. 15/458,276, including Allowed Claims, 17 Pages.

* cited by examiner

ROAD FINISHING MACHINE WITH RETAINER DEVICE FOR SUPPORTING AND POSITIONING A SENSOR UNIT

CROSS-REFERENCE TO RELATED APPLICATIONS

This application claims foreign priority benefits under 35 U.S.C. § 119(a)-(d) to German patent application number EP 17 163 505.5, filed Mar. 29, 2017, which is incorporated by reference in its entirety.

TECHNICAL FIELD

The present disclosure relates to a road finishing machine.

BACKGROUND

In practice, road finishing machines are employed to install new road surfaces by means of a screed arranged thereon. The laying material required for this is supplied from a material bunker of the road finishing machine which is arranged at the front of the road finishing machine as viewed in the direction of laying. Via material transporting means, the laying material is transported from the material bunker underneath the control platform rearwards to the screed, spread in front of the latter by means of a spreading screw, and finally installed under the screed by means of heated compacting units to form the new pavement.

To be able to install an even pavement on the ground on which the road finishing machine is moving, the screed is mounted to the chassis of the road finishing machine by means of height-adjustable screed arms. The leveling of the screed may be performed by means of a controlling system of the road finishing machine. Here, the leveling of the screed depends on the surface condition of the ground or the desired thickness of the road surface to be installed.

It is well-known that for leveling a screed of a road finishing machine, an elongated rigid measuring beam is laterally mounted to the road finishing machine and positions a plurality of sensors on one side over the ground on which the road finishing machine is moving, and on the other side over the new installed paving layer behind the screed. A problem of the known measuring beam retainers is that their assembly is difficult and time-consuming, and in particular the attachment to the road finishing machine requires good skills and in most cases several persons.

DE 602 26 237 T2, for example, shows a measuring beam device with beams arranged one upon the other which are horizontally telescopically extendable along the road finishing machine to position sensors for height measurement to control a leveling system of the road finishing machine laterally of the road finishing machine over the ground. The respective telescopic beam segments may be fixed at a desired point by means of anchors provided thereon. It is here a disadvantage that the telescopic measuring beams altogether have a high weight and can therefore be oriented horizontally only with high expenditure of force to position the respective leveling sensors at a desired point above the ground. Furthermore, the telescopic measuring beam construction is expensive to manufacture.

U.S. Pat. No. 5,975,473 discloses a measuring beam device laterally mounted to the road finishing machine. The measuring beam device is mounted to a screed arm of the road finishing machine via articulated swivel arms. Furthermore, the measuring beam device comprises a measuring beam laterally supported along the road finishing machine with a central beam and extension beams mounted to the ends thereof. At least for positioning the leveling sensors mounted to the central beam, however, essentially the complete measuring beam device has to be moved which renders the positioning of the sensors above the ground difficult.

DE 691 26 017 T2 discloses a road finishing machine with a measuring beam fixed to it which positions leveling sensors only at predetermined points above the ground. A displacement of the leveling sensors seems not to be possible there, so the measuring beam cannot be employed at different road finishing machine models.

The subsequently published European patent application No. 16 164 466.1 by Joseph Vögele AG describes a retainer device for supporting and positioning at least one sensor unit which may be mounted to an assembly beam by means of a claw-like retainer. To position the sensor unit along the assembly beam, the claw-like retainer is released from its clamping attachment and laterally displaced to a desired point along the assembly beam. The displacement of the retainer along the assembly beam is easily possible, where in particular the dislocation of the assembly beam from one side of the road finishing machine to the other side requires additional assembly works to correspondingly mount the retainer to the assembly beam.

SUMMARY

In view of the conventional solutions according to prior art, it is an object of the disclosure to provide a road finishing machine with a retainer device which is suited for a particularly flexible application for a quick assembly at different road finishing machine types, is furthermore characterized by a simple and uncomplicated assembly at the road finishing machine, that means can be altogether operated ergonomically, and is moreover applicable for a plurality of retaining possibilities for modules mounted thereto, in particular measuring units. In particular, the retainer device is to permit an operator to position the respective leveling sensors fixed thereto easily at a desired point above the ground or above the installed road surface.

The road finishing machine according to the disclosure is equipped with a height-adjustable screed mounted to a chassis of the road finishing machine for laying a paving layer, and at least one retainer device for supporting and positioning at least one sensor unit, the retainer device comprising at least one supporting arm module, at least one sensor module including the sensor unit, and at least one link movably positionable at the supporting arm module to which the sensor module may be mounted and which mounts the sensor module to the supporting arm module.

According to the disclosure, the sensor module has a retainer with a mounting plate which is releasably mounted to the link. This permits to de-install the sensor module including its retainer and the sensor unit mounted thereto from the link while the link remains mounted to the supporting arm module. This results in advantages, in particular for the assembly of the retainer device and the assembly of the same at the road finishing machine, thanks to which the operator may assemble the respective sensor units at a predetermined point more easily, quickly and securely.

The respective sensor units are, by the way, very expensive and sensitive measuring instruments which may be mounted more securely by the present disclosure than by already known solutions. The retainer of the sensor module partly embodied as a mounting plate offers a kind of assistance for the operator to appropriately mount the sensor module to the link. Furthermore, the link may be perfectly secured at a desired position along the supporting arm module without the risk of falling off the supporting arm module, whether a sensor module is mounted to it or it is not connected with a sensor module.

Preferably, the link and the supporting arm module embody a linear guide. Thereby, the link can be purposefully and precisely displaced along the supporting arm module. In the process, the link remains at the supporting arm module without being decoupled from it. Moreover, the risk of the link becoming unintentionally released from the supporting arm module may be considerably decreased thereby. Altogether, the linear guide makes it considerably easier for the operator to shift the link along the supporting arm module and to purposefully position it.

Preferably, the link is movable as a slide on a beam of the supporting arm module embodied as a guide. This results in a particular assistance for the operator when he wishes to mount the sensor module at a desired point at the supporting arm module. For doing so, he only has to shift the link along the beam while the beam is taking the weight of the link and the sensor module optionally mounted thereto off the operator.

Preferably, the link is embodied as a frame unit with respect to the beam. It may thereby be prevented that the link falls off the supporting arm module. Moreover, the link as a frame unit can be more easily shifted along the beam of the supporting arm module embodied as a guide. Furthermore, a stable mounting of the sensor module may be improved thereby.

Preferably, the link has at least one guide roller. Thereby, the link may be even more easily shifted along the supporting arm module. Preferably, the guide roller comprises an enclosure made of plastic, for example rubber, to provide a certain dampening function for the link and the sensor module coupled thereto.

Preferably, the link has a seat facing the chassis of the road finishing machine and/or a seat facing away from the chassis of the road finishing machine for releasably mounting the retainer of the sensor module. This has the technical advantage that the sensor module may be mounted to both sides or to different sides of the link whereby the retainer device may be easily mounted to both sides of the road finishing machine.

In a particular variant of the embodiment, the sensor module may be mounted in different assembly positions and/or assembly angles at the link with respect to the horizontal line. Thereby, the sensor module itself may be mounted to a supporting arm module inclined with respect to the horizontal line such that it will orient the sensor unit vertically above the ground. Thus, an oblique position of the supporting arm module with respect to the horizontal line may be evened out. This type of mounting may in particular be used when the supporting arm module is designed in steps.

It is a further advantage for the link to be integrally mounted to the retainer device. Thereby, the number of individual components of the retainer device altogether is reduced, and the link cannot be released from the supporting arm module at least without tools, so that the link cannot get lost on site and moreover the assembly of the sensor module is additionally facilitated for the operator.

Preferably, the retainer has a locking lever rotatably mounted at the mounting plate and which is configured to secure the retainer to the link. Preferably, the locking lever is mounted on a side of the mounting plate facing away from the link when the retainer is mounted to the link. The locking lever may thus be easily actuated by an operator so that there are no difficulties in securing or de-installing the mounting plate to the link or from it.

Preferably, the locking lever is pretensioned into a closed position by spring force, wherein the locking lever may be moved against the spring force from the closed position to an open position. The spring-loaded pretensioning force ensures that the locking lever securely and reliably remains in the closed position even when the road finishing machine is driving over a bumpy road or impacts are acting on the retainer device. The sensor module will thus remain securely fixed at all times. Moreover, this type of locking offers an advantageous option for the operator to de-install the mounting plate from the link swiftly and without tools.

A particularly advantageous mounting of the locking lever results if an axis of rotation of the locking lever is oriented orthogonally with respect to a plate plane of the mounting plate. This causes the retainer to have an overall compact design.

According to a particularly advantageous embodiment, the link has at least one lower and at least one upper assembly projection, wherein the lower assembly projection may be mounted to an assembly rim, and the upper assembly projection may be mounted in an assembly opening of the mounting plate. The lower and the upper assembly projections each form an excellent mounting bearing for the mounting plate so that the latter may be mounted precisely to the link in a predetermined orientation. In addition, the operator may easily recognize by the lower and the upper assembly projections how the mounting plate is to be correctly mounted to the link.

Preferably, the assembly rim comprises a plurality of indentations in a radial arrangement which may each be coupled individually to the lower assembly projection to mount the retainer to the link in different assembly orientations. Thereby, the sensor module may be mounted to the link such that an inclination of the supporting arm module with respect to the horizontal line may be evened out so that the sensor module is positioned essentially vertically above the ground.

It is also advantageous for the retainer to have at least one clamping device which is designed for a predetermined clamping force when the clamping device is in its closed position. This contributes to the clamping device exerting constant holding forces onto the component to be held, in particular to a sensor tube coupled thereto, in the closed position independent of an actuation force of the adjusting person. As a consequence, an overtension at the couple points may be avoided and the clamping device may always be opened and closed with the application of similar actuation forces.

Preferably, the retainer device is easily expandable as a modular kit and may be equipped at various road finishing machine types for diverse applications by means of specific sensor technology. In particular the ergonomic handle of the link and the retainer that can be coupled to it comply with the different configuration options in the disclosure.

The retainer device in particular also benefits from being mountable to the road finishing machine without tools and an adjustment specific to the purpose also being possible without the use of tools.

Preferably, the link comprises a clamping unit which is configured such that it may secure the link at a predetermined position with respect to the supporting arm module. It is advantageous for the clamping unit to be designed for a predetermined clamping force when it is in a closed position. The clamping unit preferably embodies a quick-action unit. Preferably, the clamping unit benefits from being movable between an opened and a closed position without tools by the adjusting person.

Preferably, the clamping unit comprises a lever clamping transmission with an operating lever for opening and closing the clamping unit, a supporting lever and a clamping lever applying a predetermined clamping force for mounting the link to the supporting arm module. In particular, when the operator is opening and closing the clamping unit, he may perceive a maximum force at the operating lever when it reaches a maximum pressure point, i.e. when it has been moved out of the opened or closed position by a predetermined angle, wherein the lever clamping transmission may be brought completely into the closed position quasi in a self-acting manner, in any way without any large expenditure of force, in particular during the closing operation after this force has been reached. The operator will perceive this by the operating lever quasi snapping into a closed position. Furthermore, this maximum force present at the lever clamping transmission around the pressure point prevents the lever clamping transmission from automatically opening out of the closed position. Other clamping units of the retainer device may also have a similar mechanism so that the assembly of the retainer device or its mounting to the road finishing machine may altogether be considerably facilitated for the adjusting person.

Preferably, the retainer device comprises a central beam which may be mounted, as part of the supporting arm module, to the road finishing machine inclined with respect to the horizontal line, projected onto a vertical plane of projection. Despite its inclined orientation, the link may be easily guided thereon and the sensor module may be mounted in a desired position.

Preferably, the retainer device furthermore comprises at least one extension beam for the central beam and at least one mounting unit releasably mounting the extension beam to one end of the central beam. In particular, the central beam and the extension beam may be connected by means of the mounting unit with respect to each other at a first assembly angle and at least one further assembly angle, as seen in a vertical plane of projection.

Preferably, the central beam and the extension beams mounted to its ends may form a stepped shape. When it comes to install large widths of spread, the stepped design has the essential advantage that the retainer device will not collide with other components of the road finishing machine, for example screed extension parts, channel plates and/or retainers for them. When large widths of spread are installed, extension parts of the screed and/or channel plates, which are arranged, as viewed in the direction of travel, in front of the extension parts with respect to lateral spreading screws, may be vertically and horizontally fixed by means of projecting supporting rods. The stepped design of the retainer device here permits the use of such supporting rods, where the function of the retainer device itself is not interfered by the supporting rods. This is permitted by the stepped design of the retainer device ensuring that the retainer device bridges the screed group of the road finishing machine.

Preferably, the sensor module has a sensor tube which is embodied to be mounted to the retainer, and where at the end of the sensor module facing away, a sensor seat is provided. Preferably, the sensor unit may be received in the sensor seat by a tongue and groove connection. Thereby, the sensor unit may be precisely guided into the sensor seat for mounting and is appropriately oriented therein above the ground. According to a variant, the sensor tube is releasably mounted to the retainer of the sensor module.

It is advantageous for the sensor unit to be fixed against rotation at the sensor module by means of a clamping unit preferably embodied as a lever clamping transmission. Thereby, a sensor of the sensor unit could be stably positioned above the ground which would provide a better measuring result.

Preferably, the clamping unit of the sensor seat is embodied as an eccentric quick-action clamp whereby the sensor unit may be particularly precisely mounted in the sensor seat.

Preferably, the respective beam segments of the retainer device are embodied as hollow profiles. Here, the respective beam segments may be embodied as aluminum profiles whereby the total weight of the retainer device may be considerably reduced.

Advantageous embodiments of the disclosure will be illustrated with reference to the attached drawings.

Equal components are provided with equal reference numerals in the figures.

DETAILED DESCRIPTION

Figure 1:
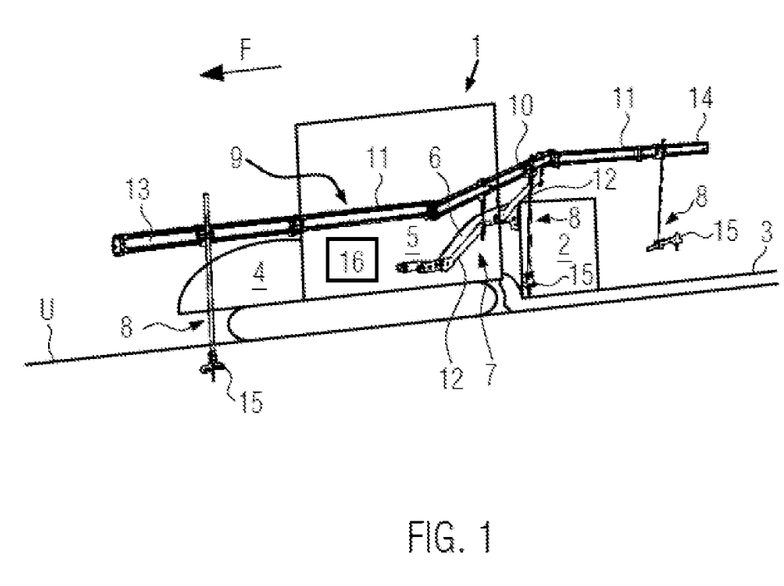
FIG. 1 shows a road finishing machine for installing a road surface with a retainer device for supporting and positioning a plurality of sensors.

FIG. 1 schematically shows a road finishing machine 1 with a height-adjustable screed 2 for laying a new paving layer 3 on a ground U. The road finishing machine 1 has a material bunker 4 arranged in front as seen in the direction of travel F from which paving material for laying is transported rearwards to the screed 2 by means of a non-depicted material transport device.

A movable screed arm 6 of the screed 2 is mounted to a chassis 5 of the road finishing machine 1. Furthermore, a retainer device 7 for supporting and positioning a plurality of sensor modules 8 is fixed to the screed arm 6. FIG. 1 shows that the retainer device 7 has a supporting arm module 9 which is oriented along the direction of travel F of the road finishing machine 1. The supporting arm module 9 has a central beam 10 and extension beams 11 mounted to its ends. The central beam 10 is mounted to the screed arm 6 by means of two swivel arms 12. The central beam 10 is supported by the two swivel arms 12 inclined with respect to the horizontal line laterally at the road finishing machine 1. The two extension beams 11 at the ends of the central beam 10 extend in parallel with respect to each other so that the central beam 10 forms, together with the extension beams 11, a stepped shape. Due to the stepped shape, the retainer device 7 will not collide with the screed 2.

Furthermore, FIG. 1 shows that one sensor module 8 each is mounted to a front extension beam 13, to the central beam 10 and to a rear extension beam 14, as seen in the direction of travel F. At respective ends of the sensor modules 8, a sensor unit 15 is provided. The two front sensor modules 8, as viewed in the direction of travel F, are positioned for a distance measurement above the ground U on which the road finishing machine 1 is moving. The sensor module 8 mounted to the rear extension beam 14 is positioned above the new paving layer 3 to perform a measurement of the distance to it. By means of the respective distance measurements, a control unit 16 embodied in the road finishing machine 1 may perform an automatic leveling of the screed 2 to create an even paving layer 3 even during a drive on uneven ground U.

Figure 2:
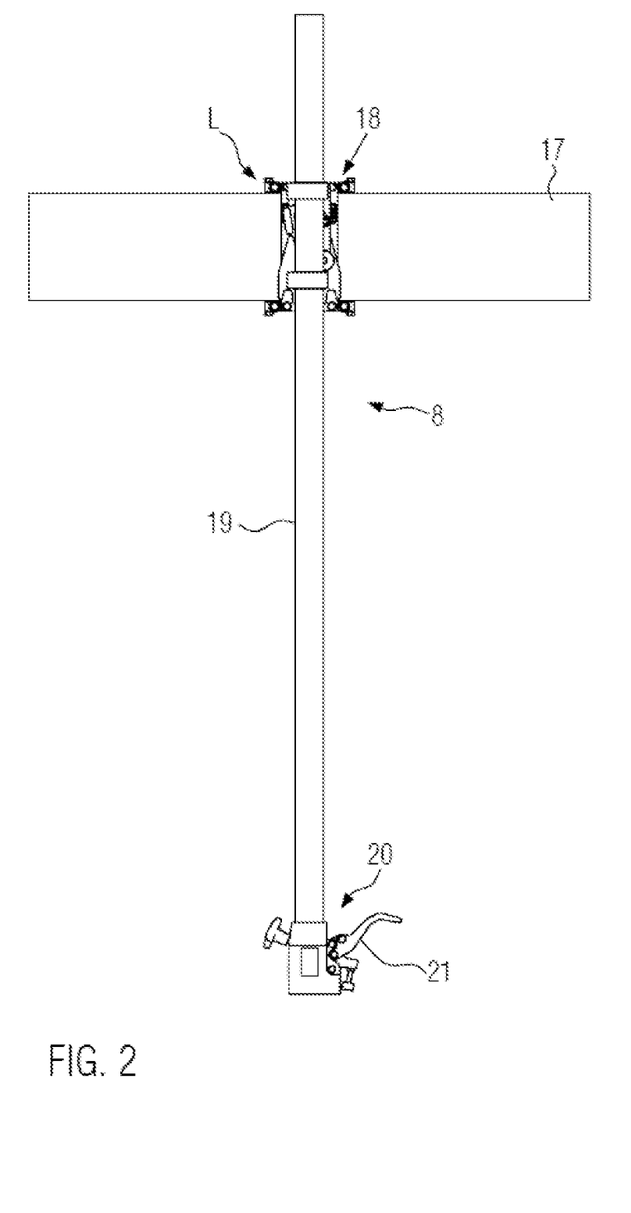
FIG. 2 shows a beam segment of the retainer device in an enlarged representation with a coulisse for the sensor module mounted thereon.

FIG. 2 shows a detail of the retainer device 7 of FIG. 1. A link 18 for supporting the sensor module 8 is mounted to a beam 17 which forms, for example, a segment of the central beam shown in FIG. 1 and/or the extension beams 11, 13, 14. The link 18 forms, according to FIG. 2, a linear guide L together with the beam 17. Thereby, the sensor module 8 coupled to the link 18 may be shifted along the beam 17.

Furthermore, FIG. 2 shows that the sensor module 8 comprises a sensor tube 19 coupled to the link 18 which comprises a sensor seat 20 at its end facing away from the link 18. The sensor seat 20 is equipped for mounting the sensor unit 15 with a lever clamping transmission 21. The lever clamping transmission 21 is configured to hold the sensor unit 15 within the sensor seat 20 by means of a predetermined clamping force.

Figure 3:
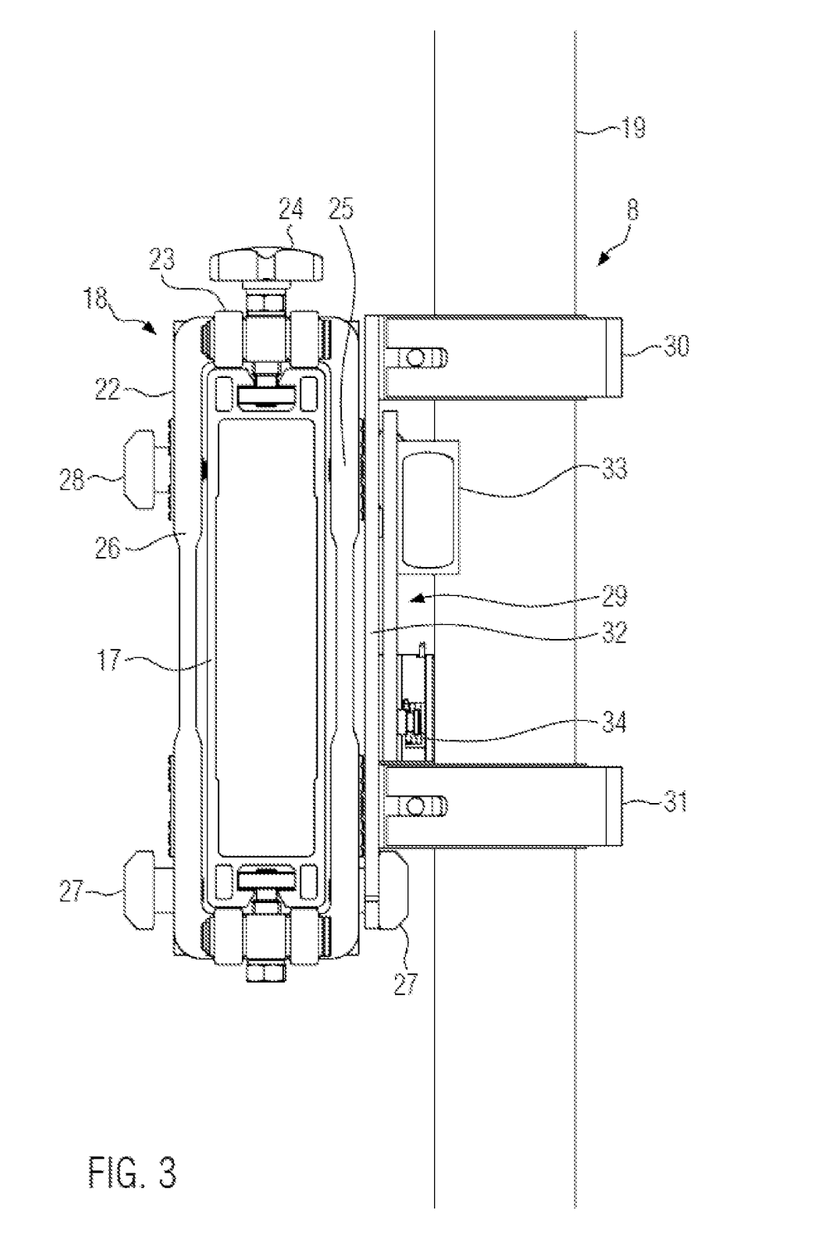
FIG. 3 shows a sectional view along the beam segment shown in FIG. 2.

FIG. 3 shows the representation of FIG. 2 in a sectional perspective through the beam 17. The beam 17 is embodied as a hollow profile according to FIG. 3. The link 18 forms a frame unit 22 which encloses the beam 17. FIG. 3 furthermore shows that the link 18 comprises a plurality of guide rollers 23 at the top and bottom, as seen in the drawing, which may each roll off on a surface of the beam 17 to be able to shift the link 18 along the beam 17 with low friction.

Furthermore, the link 18 includes a clamping unit 24 which is embodied, according to FIG. 3, as a threaded joint to apply a clamping force for fixing the link 18 with respect to the beam 17. The clamping unit, however, may also be embodied as a lever clamping transmission, in particular as an eccentric quick-action clamp, to generate a predetermined clamping force for fixing the link 18 at the beam 17.

According to FIG. 3, the sensor module 8 is mounted at a right side of the link 18. To this end, the link 18 has a seat 25 which is in particular present as a seat 25 facing away from the chassis 5 of the road finishing machine 1. To be able to mount the sensor module 8 on both sides of the link 18, the link 18 comprises, apart from the seat 25, another seat 26 opposite the seat 25 which is in particular provided as a seat 26 facing the chassis 5 of the road finishing machine 1. The respective seats 25, 26 form a part of the frame unit 22 and are, according to FIG. 3, oriented each side by side the longer sides of the beam 17.

In FIG. 3, the seats 25, 26 each have a lower assembly projection 27 and an upper assembly projection 28. Due to the mounted sensor module 8, only the lower assembly projection 27 is visible at the seat 25 in FIG. 3.

Furthermore, FIG. 3 shows that the sensor module 8 fixes the sensor tube 19 by means of a retainer 29 and supports it relative to the link 18. For this, an upper and a lower clamping device 30, 31 are provided at the retainer 29. The retainer 29 has a mounting plate 32 which is mounted in the seat 25 of the link 18. Furthermore, the retainer 29 has a locking lever 33 which releasably couples, in a closed position, the mounting plate 32 to the seat 25 of the link 18 by means of a spring 34 (see FIG. 8). The means shown in FIG. 3 show that the sensor module 8 can be releasably mounted to the link 18 on both sides. In particular, the link 18 may be shifted along the beam 7 together with the sensor module 8 coupled thereto to adjust the sensor unit 15 mounted to the sensor module 8 along the retainer device 7.

Figure 4:
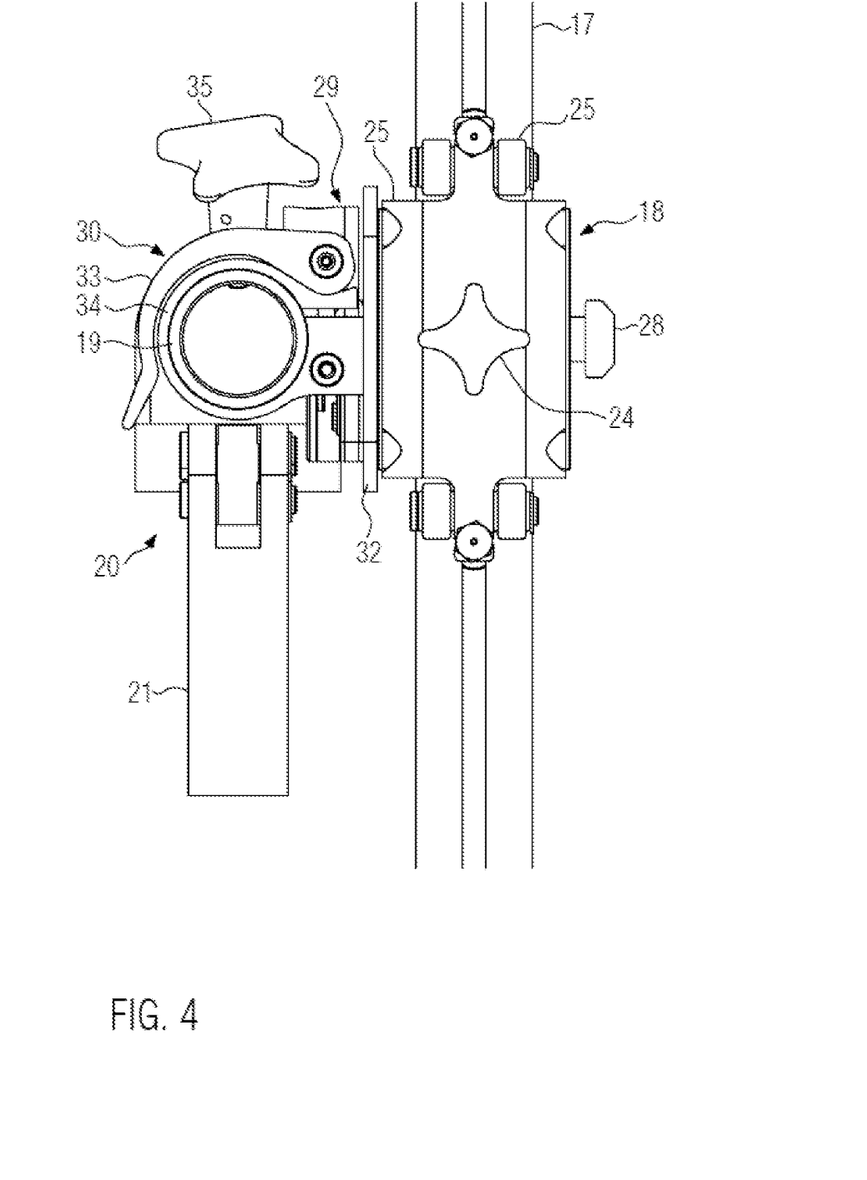
FIG. 4 shows a plan view of the arrangement shown in FIG. 2.

FIG. 4 shows the arrangement of FIG. 2 in a plan view. In particular, FIG. 4 shows that the upper clamping device 30 comprises an eccentric quick-action clamp with an eccentric lever 33 for mounting the sensor tube 19 to the retainer 29. The eccentric lever 33 acts on an annular seat 34 in which the sensor tube 19 is received. The sensor seat 20 may be mounted to the sensor tube 19 by means of a rotary knob 35. The rotary knob 35 may be embodied as part of the sensor seat 20.

In the following FIGS. 5 to 8, it will be illustrated in detail how the sensor module 8, in particular the corresponding retainer 29, may be mounted to the link 18.

Figure 5:
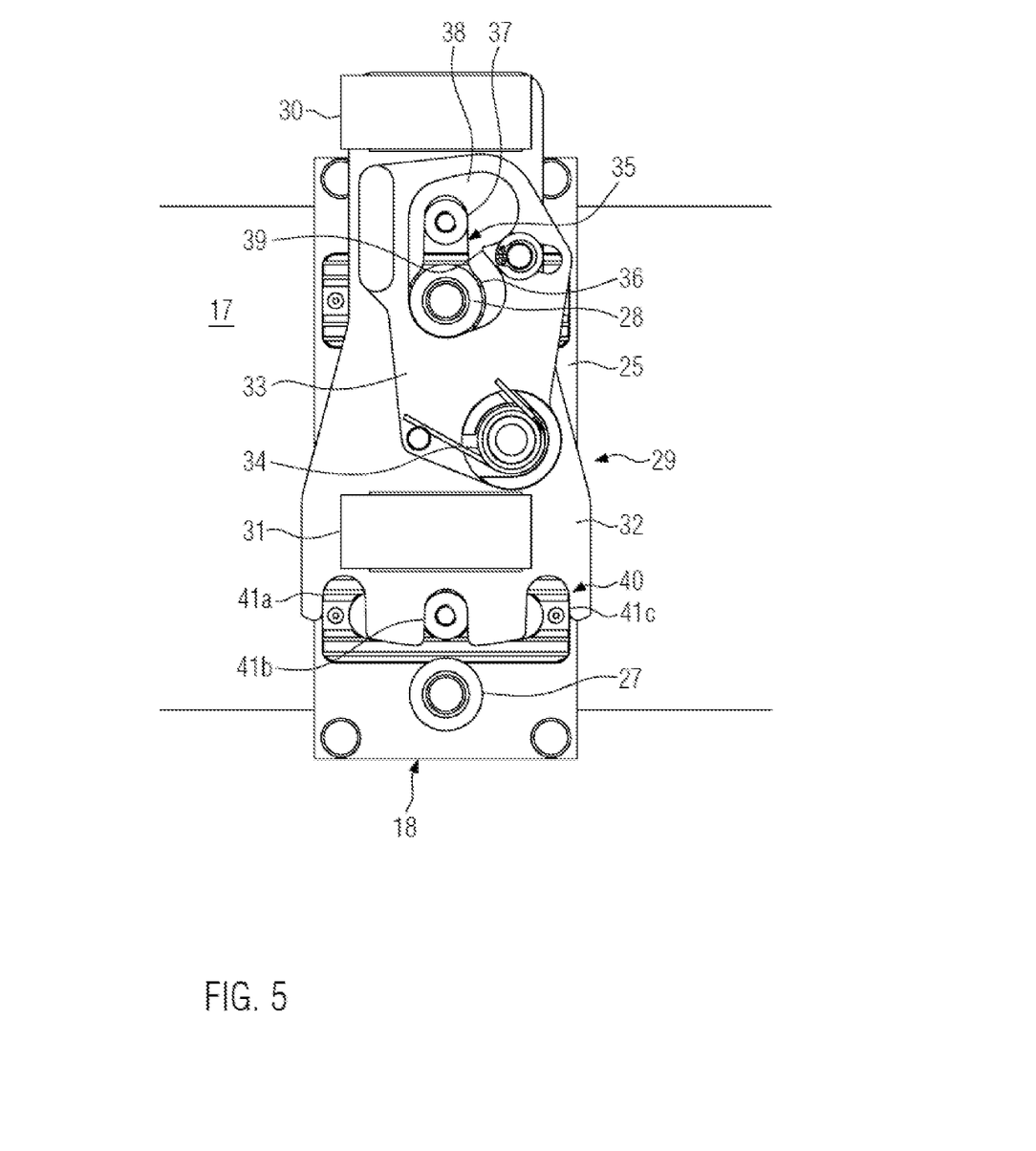
FIG. 5 shows a mounting operation of the retainer to the link.

FIG. 5 shows the retainer 29 without the sensor tube 19. According to FIG. 5, an assembly opening 35 is formed in the mounting plate 32. The assembly opening 35 forms a seat for the upper assembly projection 28. To this end, the assembly opening 35 has a seat opening 36 which essentially corresponds to the size of the upper assembly projection 28 so that the upper assembly projection 28 fits through the seat opening 36 to mount the retainer 29 at the seat 25 of the link 18. Furthermore, the assembly opening 35 comprises a locating opening 37 which is altogether smaller than the seat opening 36. To mount the retainer 29 to the link 18, first the assembly opening 35 with its seat opening 36 is slid onto the upper assembly projection 28. This is done in the orthogonal direction with respect to the image plane of FIG. 5. The upper assembly projection 28 of FIG. 5 then projects through the seat opening 36 and a recess 38 formed in the locking lever 33. Furthermore, FIG. 5 shows that the locking lever 33 forms a projection 39 projecting into the recess 38. The projection 39 is, according to FIG. 5, removed from the upper assembly projection 28 because the locking lever 33 is still in the opened position.

Furthermore, FIG. 5 shows that an assembly rim 40 is formed at the mounting plate 32. The assembly rim 40 has a plurality of indentations 41a, b, c, formed in a radial arrangement. The respective indentations 41a, b, c may be slid onto the lower assembly projection 27 of the retainer 29 to mount the sensor module 8 in different assembly orientations with respect to the link 18.

Figure 6:
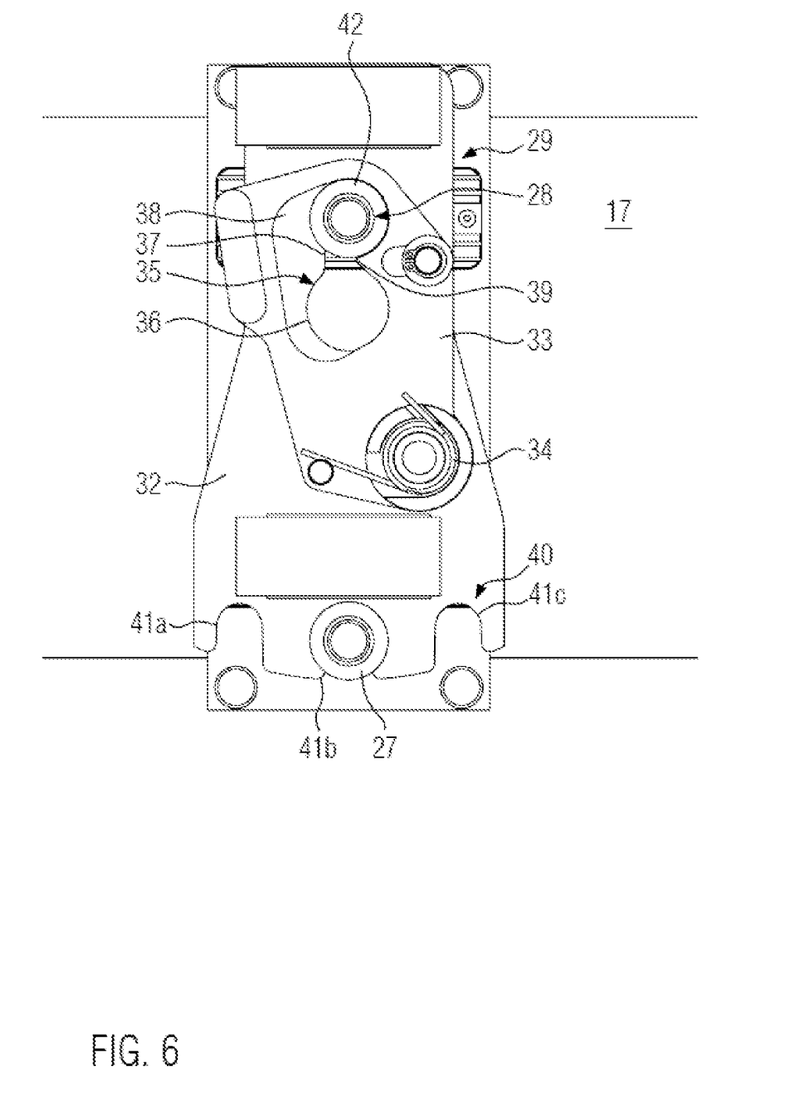
FIG. 6 shows a retainer fixed to the link for the vertical orientation of the sensor module.

From the representation shown in FIG. 5, the retainer 29 may be brought to the representation shown in FIG. 6 to fix the retainer 29 to the link 18.

FIG. 6 shows the retainer 29 when it is shifted from the pre-assembly position shown in FIG. 5 along the seat 25, 26 of the link 18 facing it downwards, as viewed in the image plane. Thereby, the upper assembly projection 28 is slid into the locating opening 37 of the seat opening 36, while the indentation 41b of the assembly rim 40 is simultaneously slid onto the lower assembly projection 27. The spring-loaded locking lever 33 snaps into a closed position in which the projection 39 can be coupled from the bottom to the upper assembly projection 28 such that the retainer 29 is secured to the link 18 against falling out. A head part 42 of the upper assembly projection projects through the locating opening 37 of the assembly opening 35 and through the recess 38 of the locking lever 33.

To remove the retainer 29 from the link 18, the locking lever 33 is rotated from the closed position shown in FIG. 6 clockwise into the opened position shown in FIG. 5, the retainer 29 is then slid upwards, as viewed in the image plane, so that the seat opening 36 is oriented above the upper assembly projection 28, and the indentation 41b is moreover decoupled from the lower assembly projection 27. The retainer is now altogether decoupled, and the sensor module may be lifted, out of the image plane, out of the seat 25 of the link 18.

Figure 7:
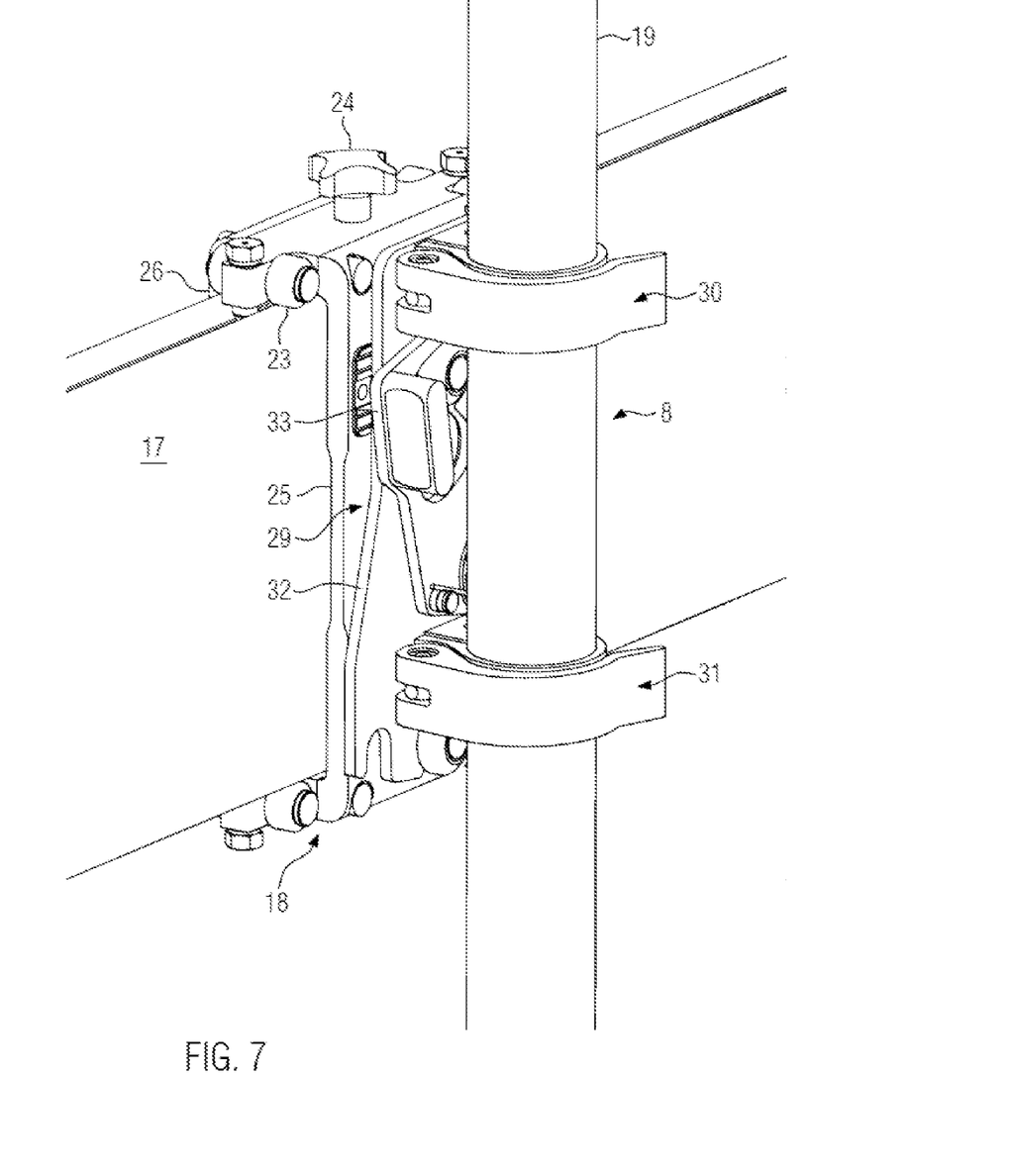
FIG. 7 shows a perspective representation of the arrangement shown in FIG. 2.

FIG. 7 shows a perspective representation of the arrangement of FIG. 6 including the mounted sensor tube 19 at the retainer 29. It is shown that the retainer 29 may remain mounted to the sensor tube 19 if the sensor module 8 as a whole is to be mounted to another link 18 or to the seat 26 facing away from the seat 25 in FIG. 7. To shift the link 18, the sensor module 8 may remain mounted to it. Thereby, the sensor module 8 may be quickly mounted to a desired point at the retainer device 7.

Figure 8:
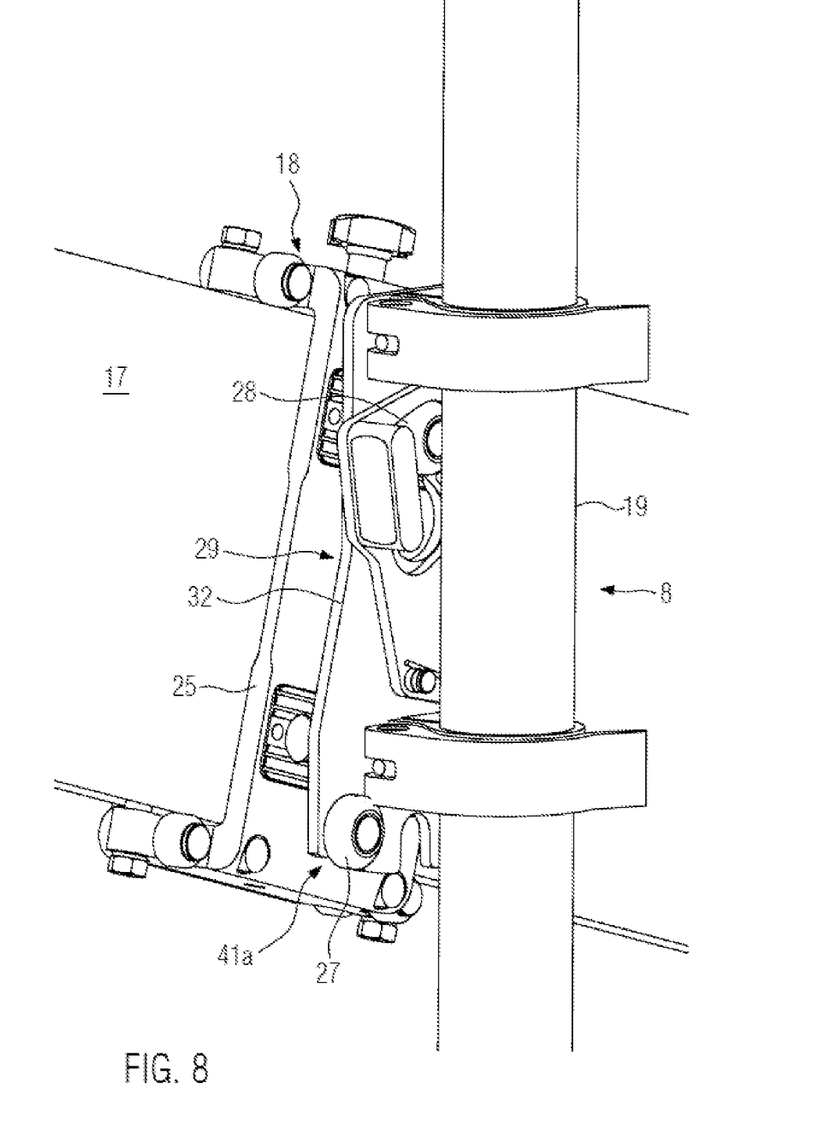
FIG. 8 shows a mounting of the link or the sensor module to a beam segment with an inclined orientation in a perspective representation.

FIG. 8 shows the sensor module 8 in an inclined assembly position with respect to the beam 17 or to the link 18, respectively. Here, the lower assembly projection 27 is shifted onto the indentation 41a. The mounting plate 32 is in this representation rotated counter-clockwise about a predetermined angle relative to the vertical line. Thereby, an oblique position of the beam 17 and the link 18 coupled thereto may be compensated to still position the sensor module 8 perpendicularly above the ground U.

Depending on the inclined position of the beam 17 or depending on whether the retainer device 7 is mounted to the chassis 5 of the road finishing machine 1 at the left and/or right in the direction of travel F, the retainer 29 may be coupled to the lower assembly projection 27 at the indentations 41a, b, c to orient the sensor module 8 as desired.

In the present disclosure, the link movably mounted to the beam 17 may, on the one hand, shift the sensor module 8 coupled thereto along the beam 17, and on the other hand fix the sensor module 8 in different assembly orientations. Since this double function may be performed without tools, the work may be considerably facilitated for an adjusting person. The retainer device 7 used in the disclosure may be attached to different road finishing machine types. In addition, an employment of the retainer device 7 at a charger vehicle is also conceivable.

What is claimed is:

1. A road finishing machine comprising:
a chassis;
a height-adjustable screed mounted to the chassis for laying a paving layer;
a sensor unit; and
a retainer device associated with the screed for supporting and positioning the sensor unit, the retainer device comprising a supporting arm module, a sensor module that supports the sensor unit, and a link movably positioned along the supporting arm module and that mounts the sensor module to the supporting arm module, wherein the supporting arm module is oriented along a direction of travel of the road finishing machine, the sensor module comprises a retainer with a mounting plate which is releasably mounted to the link, and the sensor module is mountable to the link in various assembly angles with respect to a horizontal line.

2. The road finishing machine according to claim 1 wherein the link and the supporting arm module form a linear guide.

3. The road finishing machine according to claim 1 wherein the link is movable as a slide on a beam of the supporting arm module embodied as a guide.

4. The road finishing machine according to claim 1 wherein the link is embodied as a frame unit.

5. The road finishing machine according to claim 1 wherein the link comprises at least one guide roller.

6. The road finishing machine according to claim 1 wherein the link comprises a seat facing the chassis of the road finishing machine, and/or a seat facing away from the chassis of the road finishing machine for releasably mounting the retainer of the sensor module.

7. The road finishing machine according to claim 1 wherein the sensor module is mountable to the link in various assembly positions.

8. The road finishing machine according to claim 1 wherein the supporting arm module includes a beam, and the link is mounted on the beam.

9. The road finishing machine according to claim 1 wherein the retainer comprises a clamping device designed for a predetermined clamping force when the clamping device is in a closed position.

10. The road finishing machine according to claim 1 wherein the retainer comprises a locking lever rotatably mounted to the mounting plate which is configured to secure the retainer to the link.

11. The road finishing machine according to claim 10 wherein the locking lever is pretensioned into a closed position by means of spring force, and the locking lever may be moved against the spring force from the closed position into an open position.

12. The road finishing machine according to claim 10 wherein an axis of rotation of the locking lever is oriented orthogonally to a plate plane of the mounting plate.

13. The road finishing machine according to claim 1 wherein the link comprises a lower assembly projection and an upper assembly projection, wherein the lower assembly projection may be mounted to an assembly rim and the upper assembly projection may be mounted in an assembly opening of the mounting plate.

14. The road finishing machine according to claim 13 wherein the assembly rim comprises a plurality of indentations in a radial arrangement which may each be individually coupled to the lower assembly projection to mount the retainer in different assembly orientations at the link.

15. A road finishing machine comprising:
a chassis;
a height-adjustable screed mounted to the chassis for laying a paving layer;
a sensor unit; and
a retainer device associated with the screed for supporting and positioning the sensor unit, the retainer device comprising a supporting arm module, a sensor module that supports the sensor unit, and a link that mounts the sensor module to the supporting arm module, wherein the sensor module comprises a retainer with a mounting plate which is releasably mounted to the link, the retainer comprises a locking lever rotatably mounted to the mounting plate which is configured to secure the retainer to the link, the locking lever is pretensioned into a closed position by means of spring force, and the locking lever may be moved against the spring force from the closed position into an open position.

16. The road finishing machine according to claim 15 wherein the link is movably positioned at the supporting arm module.

17. A road finishing machine comprising:
a chassis;
a height-adjustable screed mounted to the chassis for laying a paving layer;
a sensor unit; and
a retainer device associated with the screed for supporting and positioning the sensor unit, the retainer device comprising a supporting arm module, a sensor module that supports the sensor unit, and a link movably positioned at the supporting arm module and that mounts the sensor module to the supporting arm module, wherein the sensor module comprises a retainer with a mounting plate which is releasably mounted to the link, and the link comprises at least one guide roller.

18. The road finishing machine according to claim 17 wherein the retainer comprises a locking lever rotatably mounted to the mounting plate which is configured to secure the retainer to the link, the locking lever is pretensioned into a closed position by means of spring force, and the locking lever may be moved against the spring force from the closed position into an open position.

19. A road finishing machine comprising:
a chassis;
a height-adjustable screed mounted to the chassis for laying a paving layer;
a sensor unit; and
a retainer device associated with the screed for supporting and positioning the sensor unit, the retainer device comprising a supporting arm module, a sensor module that supports the sensor unit, and a link movably positioned at the supporting arm module and that mounts the sensor module to the supporting arm module, wherein the sensor module comprises a retainer with a mounting plate which is releasably mounted to the link, the link comprises a lower assembly projection and an upper assembly projection, wherein the lower assembly projection may be mounted to an assembly rim and the upper assembly projection may be mounted in an assembly opening of the mounting plate.

20. The road finishing machine according to claim 19 wherein the link comprises at least one guide roller.

* * * * *